United States Patent [19]

Woodruff

[11] Patent Number: 5,361,635

[45] Date of Patent: Nov. 8, 1994

[54] MULTIPLE SERVO LOOP ACCELEROMETER WITH TUNNEL CURRENT SENSORS

[75] Inventor: James R. Woodruff, Redmond, Wash.

[73] Assignee: AlliedSignal Inc., Morris Township, Morris County, N.J.

[21] Appl. No.: 46,338

[22] Filed: Apr. 12, 1993

[51] Int. Cl.⁵ .................................... G01P 15/13
[52] U.S. Cl. ................................... 73/517 B
[58] Field of Search .............. 73/517 B, 515, 517 AV, 73/517 R

[56] References Cited

U.S. PATENT DOCUMENTS

| | | | |
|---|---|---|---|
| 4,472,239 | 9/1984 | Johnson et al. | 437/7 |
| 4,507,170 | 3/1985 | Myhre | 156/633 |
| 4,614,119 | 9/1986 | Zavracky et al. | 73/704 |
| 4,638,669 | 1/1987 | Chou | 73/517 R |
| 4,711,128 | 12/1987 | Boura | 73/517 B |
| 4,783,237 | 11/1988 | Aine et al. | 437/15 |
| 4,841,773 | 6/1989 | Stewart | 73/510 |
| 4,882,933 | 11/1989 | Petersen et al. | 73/517 R |
| 4,891,984 | 1/1990 | Fujii et al. | 73/517 R |
| 4,901,586 | 2/1990 | Blake | 73/517 AV |
| 4,928,203 | 5/1990 | Swindal et al. | 73/517 AV |
| 4,996,877 | 3/1991 | Stewart et al. | 73/510 |
| 5,009,111 | 4/1991 | West | 73/517 B |
| 5,048,339 | 9/1991 | Neuhaus | 73/515 |
| 5,178,012 | 1/1993 | Culp | 73/517 B |

OTHER PUBLICATIONS

T. W. Kenny, et al., "Electron Tunnel Sensor Technology", Pasadena, Calif., 1990, pp. 77-92.

T. W. Kenny, et al., "A Micromachined Silicon Electron Tunneling Sensor", Napa Valley, Calif., 1990, pp. 192-196.

W. J. Kaiser, et al., "Tunnel-Effect Displacement Sensor", Pasadena, Calif., 1989, pp. i and 1-2.

S. B. Waltman, et al., "An Electron Tunneling Sensor", Pasadena, Calif., 1989, pp. 1a-9a.

A. P. Pisano, "Resonant-Structure Micromotors", Berkeley, Calif., 1989, pp. 44-48.

W. C. Tang, et al., "Laterally Driven Polysilicon Resonant Microstructures", Berkeley, Calif., 1989, pp. 53-59.

Primary Examiner—Hezron E. Williams
Assistant Examiner—Christine K. Oda
Attorney, Agent, or Firm—Howard G. Massung

[57] ABSTRACT

A servo accelerometer permits compliant suspension with a pair of flexures by using a plurality of tunnel current position sensors each respectively associated with a corresponding pair of electrostatic drive electrodes. The tunnel current position sensors and the electrostatic drive electrodes are positioned to control undesired movement of the proof mass about a first axis which is normal to the input axis of the accelerometer. In another embodiment, three tunnel current sensors and three pairs of drive electrodes are used to control movement of the proof mass about the first axis and a second axis.

9 Claims, 2 Drawing Sheets

MULTIPLE SERVO LOOP ACCELEROMETER WITH TUNNEL CURRENT SENSORS

FIELD OF THE INVENTION

The present invention relates to micromachined devices used for measuring acceleration, and more particularly, to a servo accelerometer utilizing a plurality of tunnel current sensors placed in a predetermined pattern for sensing the position of a proof mass and corresponding electrostatic drives to reposition the proof mass to a servo null position to measure the acceleration of a body.

BACKGROUND OF THE INVENTION

The Kenny et al article entitled "Electron Tunnel Sensor Technology", presented at the first national conference and exhibition of NASA's technology for transfer in November of 1990, describes a micromachined servo accelerometer that utilizes a tunnel current sensor. The accelerometer is micromachined from silicon and includes a cantilever spring with an integral tip. A gold film is deposited over the tip to form a tunnel current electrode. A gold film is also deposited over the cantilever spring to form an electrostatic drive electrode. The inner rectangular area of the folded cantilever spring, here referred to as a proof mass, can be deflected relative to the outer segments, here referred to as a frame, by application of an electric potential between the drive electrode and a corresponding drive electrode disposed on another component of the accelerometer.

Once assembled, a bias voltage is applied to the electrostatic drive electrodes to close the electrodes and drive the proof mass to a servo null position at which a tunnel current having a predetermined value is established. Active regulation of the tip-electrode separation is carried out using feedback control.

Operation of the device as an accelerometer may be achieved in either of two ways. In the first approach, denoted as open loop, acceleration is measured at frequencies above the feedback loop bandwidth in accordance with a predetermined mathematical relationship. In the second approach, denoted as closed loop, acceleration is measured for all frequencies less than the feedback loop bandwidth. In this case, an acceleration displaces the proof mass. The displacement results in a corresponding change in the tunnel current from its predetermined value. A feedback loop responds to the change in the tunnel current by adjusting the voltage potential between the drive electrodes so as to return the proof mass to its servo null position. The variation in the voltage from its bias value is used to calculate the acceleration value since the acceleration value is a function of the voltage variation.

The drive electrodes of the accelerometer can only apply an attractive force which draws the electrodes toward one another. As a result, the electrostatic drive can provide the required servo rebalance force only when the acceleration is in a direction which drives the electrodes apart from one another. When an acceleration is applied in the opposite direction in which the electrodes are driven toward one another, the voltage difference between the electrodes is decreased thereby decreasing the drive force. The flexures which connect the proof mass to the frame then provide an elastic force to return the proof mass to its servo null position. Without acceleration, the elastic force provided by the flexures must at least be equal to the rebalance force required to reposition the proof mass to its servo null position upon application of full scale acceleration. Likewise, the electrostatic drive must be capable of providing enough force to drive the proof mass to its servo null position upon application of full scale acceleration. To provide the necessary dynamic response, the forces which the electrostatic drive and the flexures are respectively capable of providing must exceed the minimum force required to reposition the proof mass to its servo null position upon application of full scale acceleration.

The accelerometer of the Kenny et al article is deficient in several respects. Both the stiffness of the flexures and the position at which the flexures hold the proof mass when no forces are applied (i.e., the mechanical null position) can change with aging, temperature, and other environmental effects. Such changes produce a corresponding change in the drive force required to keep the proof mass at its servo null position and thus effect the bias voltage applied to the drive electrodes. Also, changes in the values of the components of the electrical circuitry of the feedback loop can cause a change in the servo null position to a position where the elastic force from the flexures is different from the elastic forces of the original servo null position. This alters the drive force required to hold the proof mass so that the drive force at the new null position is different from the drive force required at the original null position. Since the drive voltage generated by the drive voltage is used to calculate the acceleration value, such changes cause a change in the acceleration signal bias.

A further deficiency of the Kenny et al accelerometer is that the force on the electrostatic drive electrodes is approximately proportional to the square of the charge on the drive electrodes. There is thus a non-linear relationship between the acceleration value and the drive voltage variations used to measure the acceleration.

An invention which overcomes many of the problems associated with the Kenny et al device is shown and described in U.S. Ser. No. 07/986,958 filed Dec. 8, 1992 (Dkt. No. B04246). Use of the complimentary electrostatic drive configuration shown in that application greatly reduces the effect of the elastic suspension forces on the acceleration signal bias. Since the requisite elastic suspension force is greatly reduced, the various components of the accelerometer may be arranged so that the electrical null and mechanical null positions substantially coincide. Furthermore, the complimentary configuration allows the accelerometer to provide an output signal which is linearly related to the acceleration of the proof mass.

The invention of the foregoing application desirably allows use of highly compliant flexure structures to connect the proof mass to the frame so that any bias of the sensed acceleration signal is minimized. Long, thin flexures, by bending in an S bending mode in which opposite ends bend oppositely, permit linear motion of the proof mass along the input axis. However, such highly compliant flexures also permit undesired motion about axes in the plane of the flexures.

SUMMARY OF THE INVENTION

The present invention is directed to a servo accelerometer that overcomes the aforementioned problems associated with the use of a highly compliant suspension of the proof mass. To control undesired motion of the proof mass, the present invention uses a plurality of tunnel current position sensors each respectively associated with a pair of electrostatic drive electrodes. The tunnel current sensors and drive electrodes are placed in a predetermined pattern for sensing the relative displacement of the proof mass and for maintaining the proof mass in its servo null position and controlling undesired motion of the proof mass.

Two embodiments of the present invention are described herein. In each embodiment, the highly compliant suspension includes a pair of spaced apart flexures that extend substantially along opposite sides of the proof mass to suspend the proof mass from the frame. By bending oppositely at opposite end, the long flexures permit linear motion of the proof mass along the input axis. Due to their high compliance, however, the flexures also permit undesirable motion about axes normal to the input axis of the accelerometer.

In one embodiment of the invention, two tunnel current sensors and two corresponding pairs of drive electrodes control undesired motion about a single axis. In a second embodiment, three tunnel current sensors and three pairs of drive electrodes control undesired motion about two axes.

In operation, each of the tunnel current sensors is used to generate a respective sensing signal indicative of the displacement of the proof mass due to acceleration. The sensing signals of the tunnel current sensors are applied to respective servo feedback circuits which provide feedback signals to the electrostatic drive electrodes corresponding to respective ones of the tunnel current sensors. The electrostatic drives apply restoring forces to the proof mass to reposition the proof mass to its servo null position. The sum of these feedback signals is proportional to sensed acceleration and is used as an output signal of the servo accelerometer.

The present invention allows for use of a highly compliant suspension of the proof mass. Use of a highly compliant suspension reduces bias of the acceleration signal caused by the difference between the proof mass servo null position and the proof mass position in which there is no force applied by the elastic suspension (i.e., mechanical null position).

BRIEF DESCRIPTION OF THE DRAWINGS

Other objects and features of the present invention may be further understood by reference to the following detailed description of the preferred embodiments of the invention taken in conjunction with the accompanying drawings, on which.

It will be understood that the drawings are not necessarily to scale. In certain instances, details which are not necessary for understanding the present invention have been omitted for clarity.

DESCRIPTION OF THE PREFERRED EMBODIMENTS

Figure 1:
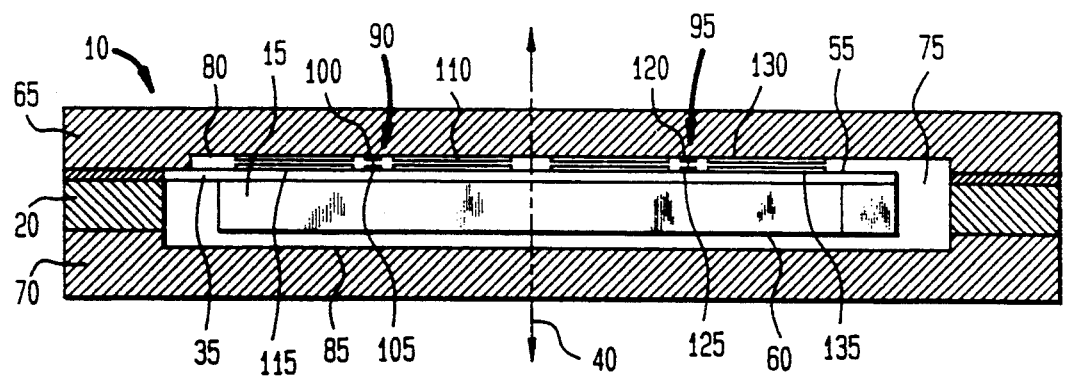
FIG. 1 is a cross sectional view of a servo accelerometer with two tunnel current position sensors and two pair of electrostatic drive electrodes according to one embodiment of the present invention.
Figure 2:
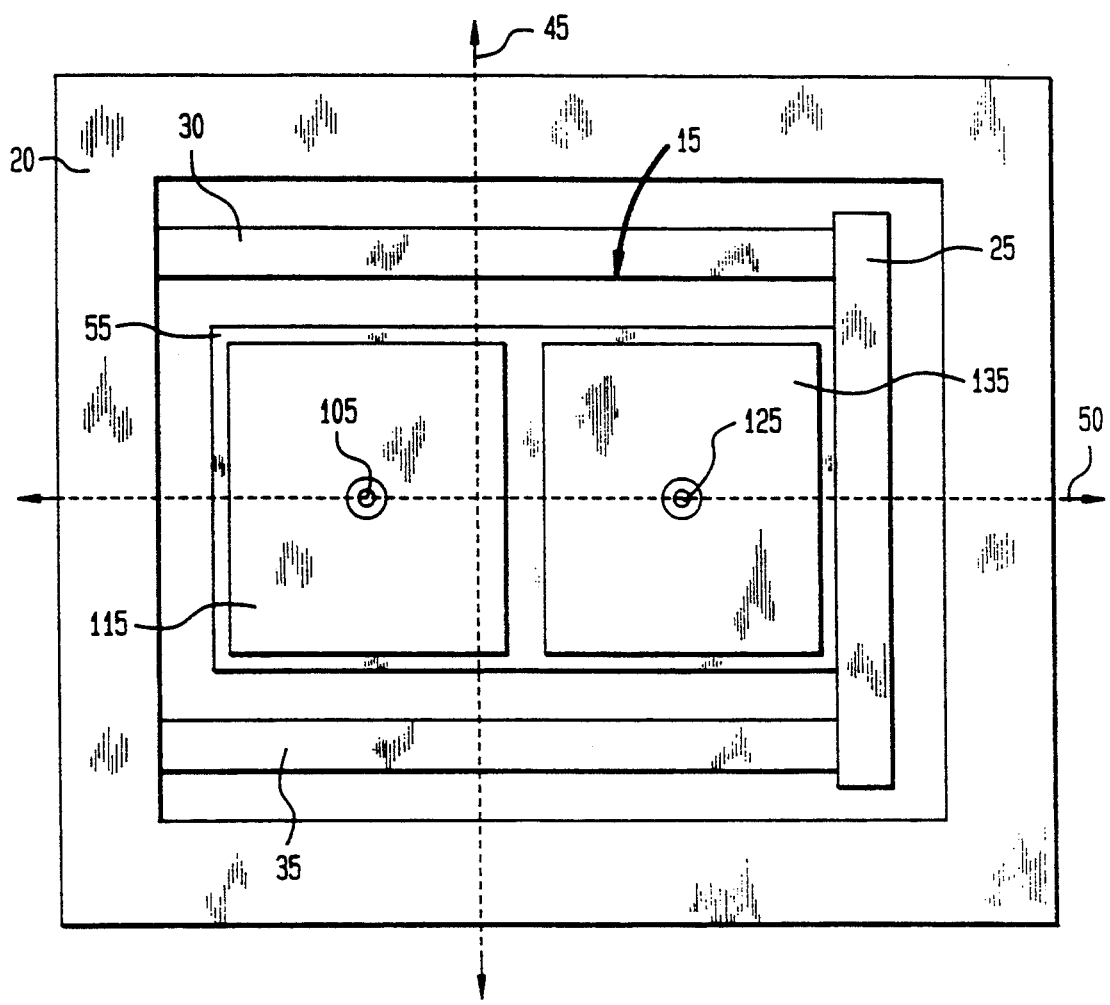
FIG. 2 is a plan view of the structure shown in FIG. 1.

FIGS. 1 and 2 show a servo accelerometer 10 in accordance with a first embodiment of the invention. The servo accelerometer 10 includes a proof mass 15 which is coupled to a frame 20 with a highly compliant suspension system including a first and second flexures 30 and 35. The flexures 30,35 extend longitudinally along the proof mass 15 and are connected by the connecting member 25 of the proof mass 15. The flexures 30,35 operate in an S-bend mode to permit substantially linear motion of the proof mass 15 along an input axis 40. This is the desired mode of operation of the flexures.

The flexures also permit undesired rotation of the proof mass about axes in the plane of the flexures and normal to the input axis of the accelerometer. By simple bending, the flexures permit rotation about axis 45. By S bending in opposite directions, the flexures permit rotation about axis 50. The compliance about axis 45 is much greater than that about axis 50.

The proof mass 15 is preferably fabricated from a silicon wafer and is formed with a pair of opposed face portions 55 and 60. The frame 20 is bonded with upper and lower cover plates 65 and 70 and is in a fixed position with respect to the body whose acceleration is to be measured. Together, the frame 20 and cover plates 65,70 define a chamber 75. The upper cover plate 65 includes a surface 80 which is closely spaced from the proof mass face portion 55. Similarly, the lower cover plate 70 includes a surface 85 closely spaced from the proof mass face portion 60.

FIGS. 1 and 2 also illustrate the placement of first and second tunnel current sensors 90 and 95 in accordance with one embodiment of the present invention. With reference to position sensor 90, the tunnel current sensor 90 operates when a potential is applied across first and second sensing electrodes 100 and 105 and the electrodes are drawn sufficiently close to each other so that electrons from the first electrode 100 reach the second electrode 105. For this reason, those skilled in the art sometimes refer to the first sensing electrode 100 as an electron emission electrode and the second sensing electrode 105 as a positive electrode. The electron penetration provides a tunnel current that is extremely sensitive to the separation of the first and second sensing electrodes 100 and 105. Accordingly, any movement or vibration affecting the distance between the electrodes results in a corresponding change in the magnitude of the tunnelling current. The change in the magnitude of tunnel current is used to provide a position sensing signal.

As best seen in FIG. 1, the first tunnel current sensor 90 includes the electron emission electrode 100 connected to the upper cover plate surface 80 in substantially fixed alignment with the frame 20 and the positive electrode 105 attached to the face portion 55 of the proof mass 15. A first pair of electrostatic drive electrodes 110,115 are respectively associated with the tunnel current sensor 90. A first electrostatic drive electrode 110 is disposed on the surface 80 of the cover plate 65 and substantially surrounds the emission electrode 100. A second electrostatic drive electrode 115 is disposed on the face portion 55 of the proof mass 15 and substantially surrounds the positive electrode 105.

Likewise, the second tunnel current sensor 95 includes an electron emission electrode 120 connected to the surface 80 of the upper cover plate 65 in a substantially fixed position with respect to the frame 20 and a positive electrode 125 which is attached to the face portion 55 of the proof mass 15. A second pair of electrostatic drive electrodes 130,135 are respectively associated with the second tunnel current sensor 95. A first electrostatic drive electrode 130 is disposed on surface 80 of the cover plate 65 and surrounds the emission electrode 120. A second electrostatic drive electrode 135 is disposed on face portion 55 of the proof mass 15 and substantially surrounds the positive electrode 125.

FIG. 2 shows the placement of the tunnel current electrodes and electrostatic drive electrodes on the face portion 55 of proof mass 12. The first positive electrode 105 and second positive electrode 125 are spaced on opposite sides of the axis 45. Preferably, the positive electrodes are aligned with a longitudinal axis 50 which bisects the transverse dimension of the proof mass 15 and is perpendicular to axis 45 and normal to the input axis 40.

Although not shown in the drawings, each of the drive electrodes may be associated with a corresponding pair of drive electrodes disposed on the side of the proof mass proximate face portion 60 to provide complementary drive of the proof mass. Such a complementary drive is shown and described in U.S. Ser. No. 07/986,958, filed Dec. 8, 1992 (Dkt. No. B04246).

Each tunnel current sensor and its respective drive electrodes may be connected to external circuitry in a complementary configuration such as shown in U.S. Ser. No. 07/986,958, filed Dec. 8, 1992 (Dkt. No. B04246). In operation, position sensing signals are generated by position sensing circuitry which includes the respective tunnel current sensor. The sensing signals are supplied to a drive circuit which is used to generate electrostatic drive signals which drive the corresponding drive electrodes. In this way, the proof mass is constrained from undesired rotation about the axis 45. A summer circuit may be used to combine the drive signals of the respective drive circuits to provide an output signal indicative of acceleration of the proof mass.

Figure 3:
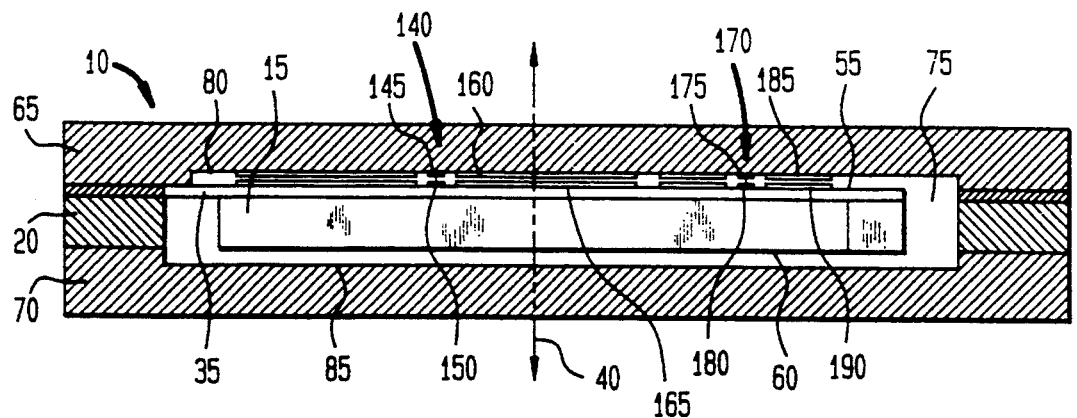
FIG. 3 is a cross sectional view of a servo accelerometer with three tunnel current position sensors and three pair of electrostatic drive electrodes according to another embodiment of the present invention.
Figure 4:
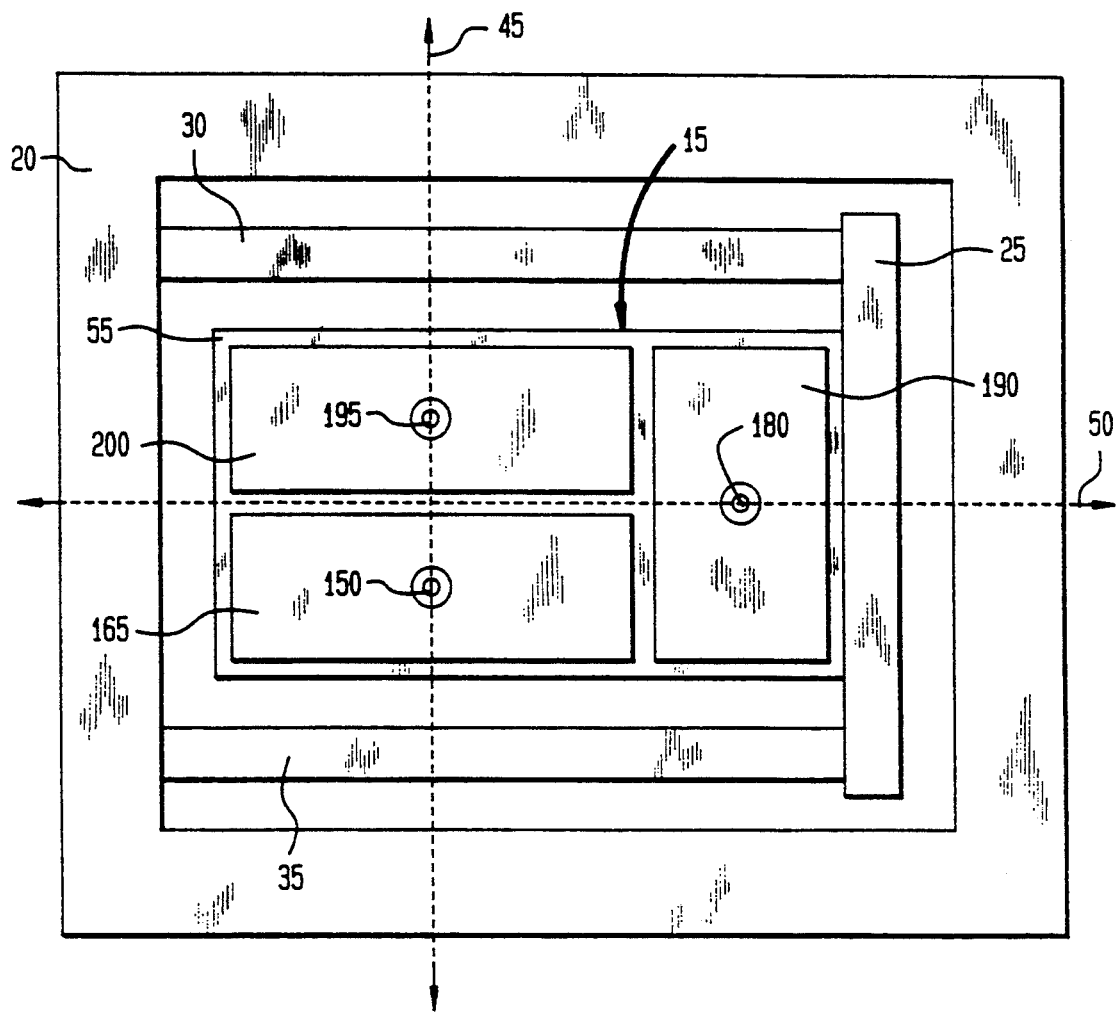
FIG. 4 is a plan view of the servo accelerometer shown in FIG. 3.

FIGS. 3 and 4 illustrate a different configuration of the sensors and drive electrodes. In this embodiment, three tunnel current position sensors and three pairs of drive electrodes are used for preventing undesired motion of the proof mass with respect to two axes. As best seen in FIG. 3, a first tunnel current sensor 140 includes an electron emission electrode 145 connected to the upper cover plate surface 80 in substantially fixed alignment with the frame 20 and a positive electrode 150 connected to the face portion 55 of the proof mass 15. A first pair of electrostatic drive electrodes 160,165 is respectively associated with the tunnel current sensor 140. The first pair of drive electrodes includes a first electrostatic drive electrode 160 which is connected to the surface 80 of the cover plate 65 and surrounds the first electron emission electrode 145. A second tunnel current sensor 170 includes an electron emission electrode 175 connected to the upper cover plate surface 80 in substantially fixed alignment with the frame 20 and a positive electrode 180 connected to the face portion 55 of the proof mass 15. A second pair of electrostatic drive electrodes 185,190 is associated with the second tunnel current sensor 170. In a similar fashion, a third tunnel current sensor (see FIG. 4) includes an electron emission electrode (not shown) attached to the surface 80 of the cover plate 65 in fixed alignment with the frame 20 and a positive sensing electrode 195 (See FIG. 4) attached to the face portion 55 of the proof mass 15.

A third pair of drive electrodes is associated with the third tunnel current sensor. However, only one drive electrode 200 of the third pair of electrodes is shown in the drawings.

FIG. 4 shows the placement of the tunnel current electrodes and electrostatic drive electrodes connected to the proof mass face portion 55. The positive electrode 150 of the first tunnel current sensor 140 is substantially surrounded by drive electrode 165. The positive sensing electrode 180 of the second tunnel current sensor 170 is aligned with the longitudinal axis 50 and is substantially surrounded by drive electrode 190. Likewise, the positive electrode 195 of the third tunnel current sensor is surrounded by drive electrode 200. The second and third tunnel current sensors are spaced equidistant from the longitudinal axis 50. The first and third tunnel sensors are spaced from the second tunnel current sensor so that the proof mass 15 is constrained from undesired rotation about the axis 45 as well as the longitudinal axis 50. The drive electrodes respectively associated with the electron emission electrodes on the cover plate 65 are likewise disposed in a similar configuration.

As was the case with respect to the embodiment of FIGS. 1 and 2, the embodiment of FIGS. 3 and 4 may include corresponding electrode pairs on the opposite side of the proof mass to provide complementary drive of the proof mass. Such a complementary drive configuration is shown and described in U.S. Ser. No. 07/986,958, filed Dec. 8, 1992 (Dkt. No. B04246).

Although the electron emission electrodes of each tunnel current sensor are shown as being connected to the cover plate 65 while the corresponding positive electrode is connected to the proof mass 15, those of ordinary skill in the art will recognize that these structures may be reversed. The electron emission electrodes may thus be placed on the proof mass and the positive electrodes on the cover plate. Additionally, the electron emission electrodes have been described as being in substantially fixed alignment with the frame via co-attachment of the frame, cover plate, and emission electrodes. However, such fixed alignment need only be met when the accelerometer is subject to normal range acceleration inputs within the design range of the accelerometer. Although not forming a part of the present invention, the tunnel current sensors may be provided with force relief mechanisms such as shown and described in U.S. Ser. No. 07/987,947, filed Dec. 8, 1992 (Dkt. No. B04245). If such force relief is provided, the emission electrodes are only in fixed alignment with the frame under normal range inputs while being displaced with respect to the frame upon application of an acceleration overload.

By way of nonlimiting example, the proof mass 15 has an area of 5 square millimeters and thickness of 0.2 millimeters, the flexures 30 and 35 have a thickness of 5 micrometers, and the distance between opposed electrostatic drive electrodes is 5 micrometers. The nominal spacing between the tunnel current electrodes is 0.5 nanometers.

By allowing use of highly compliant flexures, the servo accelerometer reduces the force applied by the flexures 30 and 35 to the proof mass 15 and therefore decreases any signal bias caused by a difference in the servo null position and the position of the proof mass for which there is no force applied from the elastic suspension ("mechanical null position"). In addition, compliant suspension tends to minimize environmental effects on the servo accelerometer.

While several embodiments of the invention have been described hereinabove, those of ordinary skill in the art will recognize that the embodiments may be modified and altered without departing from the central spirit and scope of the invention. Thus, the preferred embodiments described hereinabove are to be considered in all respects as illustrative and not restrictive, the scope of the invention being indicated by the appended claims rather than by the foregoing description. Therefore, it is the intention of the inventors to embrace herein all changes which come within the meaning and range of equivalency of the claims.

What is claimed is:

1. An accelerometer having a proof mass coupled to a frame with a highly compliant suspension, said accelerometer comprising:
    first and second tunnel current sensors disposed on opposite sides of a normal axis which is normal to an input axis of said accelerometer and aligned on a further axis which is perpendicular to said normal axis and normal to said input axis, each of said first and second tunnel current [sensor]sensors having a first sensing electrode disposed in substantially fixed relation to said frame and a second sensing electrode disposed on said proof mass in close proximity to said first sensing electrode;
    A first pair of drive electrodes disposed proximate said first tunnel current sensor; and
    a second pair of drive electrodes disposed proximate said second tunnel current sensor, said first and second pair of drive electrodes disposed on opposite sides of said normal axis to control undesired movement of said proof mass about said normal axis.

2. The accelerometer as claimed in claim 1 wherein said first and second tunnel current sensors are disposed equidistant from said normal axis.

3. The accelerometer as claimed in claim 1 wherein said first pair of drive electrodes comprises:
    a first drive electrode forming a first plate which substantially surrounds said first sensing electrode of said first tunnel current sensor; and
    a second drive electrode forming a second plate which substantially surrounds said second sensing electrode of said first tunnel current sensor.

4. The accelerometer as claimed in claim 1 wherein said second pair of drive electrodes comprises:
    a first drive electrode forming a third plate which substantially surrounds said first sensing electrode of said second tunnel current sensor; and
    a second drive electrode forming a fourth plate which substantially surrounds said second sensing electrode of said second tunnel current sensor.

5. An accelerometer having a proof mass coupled to a frame with a highly compliant suspension, said accelerometer comprising:
    first and second tunnel current sensors disposed on opposite sides of a first axis which is normal to an input axis of said accelerometer;
    a third tunnel current sensor, said second and third tunnel current sensors disposed on opposite sides of a second axis which is perpendicular to said first axis and normal to said input axis, each of the first, second and third tunnel current sensors having a first sensing electrode disposed in substantially fixed relation to said frame and a second sensing electrode disposed on said proof mass in close proximity to said first sensing electrode;
    a first pair of drive electrodes disposed proximate said first tunnel current sensor;
    a second pair of drive electrodes disposed proximate said second tunnel current sensor; and
    a third pair of drive electrodes disposed proximate said third tunnel current sensor, said first and second pair of drive electrodes disposed on opposite sides of said first axis and said second and third pair of drive electrodes disposed on opposite sides of said second axis so as to control undesired movement of said proof mass about said first and second axes.

6. An accelerometer as claimed in claim 5 wherein said first tunnel current sensor and said first pair of drive electrodes are disposed on said second axis.

7. An accelerometer as claimed in claim 5 wherein said second and third tunnel current sensors and said second and third pair of drive electrodes are disposed equidistant from said second axis.

8. The accelerometer as claimed in claim 5 wherein each of said first, second and third pair of drive electrodes comprises:
    a first drive electrode forming a plate substantially surrounding the respective first sensing electrode; and
    a second drive electrode forming a plate substantially surrounding the respective second sensing electrode.

9. An accelerometer having a proof mass coupled to a frame with a highly compliant suspension, said accelerometer comprising:
    first and second tunnel current sensors disposed on opposite sides of a normal axis which is normal to an input axis of said accelerometer, and aligned on a further axis which is perpendicular to said normal axis and normal to said input axis, each of said first and second tunnel current sensors having a first sensing electrode disposed in substantially fixed relation to said frame and a second sensing electrode disposed on said proof mass in close proximity to said first sensing electrode;
    a first pair of drive electrodes disposed proximate said first tunnel current sensor; and
    a second pair of drive electrodes disposed proximate said second tunnel current sensor, said first and second pair of drive electrodes disposed on opposite sides of said normal axis equidistant from said normal axis to control undesired movement of said proof mass about said normal axis.

* * * * *